United States Patent
Guo et al.

(10) Patent No.: US 12,142,753 B2
(45) Date of Patent: Nov. 12, 2024

(54) CATHODE AND ELECTROCHEMICAL DEVICE

(71) Applicant: DONGGUAN POWERAMP TECHNOLOGY LIMITED, Dongguan (CN)

(72) Inventors: Feilong Guo, Ningde (CN); Juan Jin, Ningde (CN); Xinbing Chen, Ningde (CN); Hongming Yu, Ningde (CN)

(73) Assignee: DONGGUAN POWERAMP TECHNOLOGY LIMITED, Dongguan (CN)

( * ) Notice: Subject to any disclaimer, the term of this patent is extended or adjusted under 35 U.S.C. 154(b) by 624 days.

(21) Appl. No.: 16/964,746

(22) PCT Filed: May 22, 2020

(86) PCT No.: PCT/CN2020/091800
§ 371 (c)(1),
(2) Date: Jul. 24, 2020

(87) PCT Pub. No.: WO2021/012768
PCT Pub. Date: Jan. 28, 2021

(65) Prior Publication Data
US 2021/0313563 A1    Oct. 7, 2021

(30) Foreign Application Priority Data
Jul. 19, 2019    (CN) .......................... 201910655730.8

(51) Int. Cl.
*H01M 4/36*    (2006.01)
*H01M 4/131*    (2010.01)
(Continued)

(52) U.S. Cl.
CPC ........... *H01M 4/364* (2013.01); *H01M 4/131* (2013.01); *H01M 4/505* (2013.01); *H01M 4/525* (2013.01);
(Continued)

(58) Field of Classification Search
CPC ...... H01M 4/364; H01M 4/131; H01M 4/505; H01M 4/525; H01M 10/0525;
(Continued)

(56) References Cited

U.S. PATENT DOCUMENTS

2006/0222951 A1* 10/2006 Tatsumi ................ H01M 4/582
429/231.95
2012/0328942 A1    12/2012 Thomas-Alyea et al.
(Continued)

FOREIGN PATENT DOCUMENTS

CN    101714630 A    5/2010
CN    102751485 A    10/2012
(Continued)

OTHER PUBLICATIONS

Ryu, H. H., Park, K. J., Yoon, C. S., & Sun, Y. K. (2018). Capacity fading of Ni-rich Li [Ni x Co y Mn1-x-y] O2 (0.6≤ x≤ 0.95) cathodes for high-energy-density lithium-ion batteries: bulk or surface degradation?. Chemistry of materials, 30(3), 1155-1163. (Year: 2018).*
(Continued)

*Primary Examiner* — Milton I Cano
*Assistant Examiner* — Albert Michael Hilton
(74) *Attorney, Agent, or Firm* — Maier & Maier, PLLC

(57) ABSTRACT

A cathode includes a cathode current collector; and a cathode active material layer disposed on a surface of the cathode current collector. The cathode active material layer includes a first particle and a second particle, the first particle including a secondary particle composed of a third
(Continued)

particle, the third particle being a primary particle, the first particle having an average particle size of 5 μm to 20 μm, the third particle having an average particle size of 200 nm to 700 nm, the second particle including a fourth particle and/or a secondary particle composed of the fourth particle, the fourth particle being a primary particle, the second particle having an average particle size of 3 μm to 5 μm, the fourth particle having an average particle size of 800 nm to 5 μm.

14 Claims, 3 Drawing Sheets

(51) Int. Cl.
*H01M 4/505* (2010.01)
*H01M 4/525* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01); *H01M 2220/30* (2013.01)

(58) Field of Classification Search
CPC ..... H01M 2004/021; H01M 2004/028; H01M 2220/30; H01M 10/525
See application file for complete search history.

(56) References Cited

U.S. PATENT DOCUMENTS

| | | | | |
|---|---|---|---|---|
| 2014/0370337 | A1* | 12/2014 | Matsui | H01M 4/131 429/61 |
| 2017/0050864 | A1* | 2/2017 | Matsumoto | C01G 45/1228 |
| 2018/0287202 | A1* | 10/2018 | Matsushita | H01M 4/583 |

FOREIGN PATENT DOCUMENTS

| | | |
|---|---|---|
| CN | 103165935 | 6/2013 |
| CN | 103811744 | 5/2014 |
| CN | 104241680 | 12/2014 |
| CN | 105161710 A | 12/2015 |
| CN | 106030864 A | 10/2016 |
| CN | 108475772 A | 8/2018 |
| CN | 110010975 A | 7/2019 |
| CN | 110429252 | 11/2019 |
| JP | 2005135634 A | 5/2005 |
| JP | 2009026599 | 2/2009 |
| JP | 2010086693 | 4/2010 |
| JP | 2013120724 | 6/2013 |
| JP | 2017107727 | 6/2017 |
| JP | 2019515465 | 6/2019 |
| WO | 2005018027 | 2/2005 |

OTHER PUBLICATIONS

Rao, M. C., Begum, S. M., Reddy, E. S., & Hussain, O. M. (Jun. 2012). Electrical conduction behavior of $LiNi_xCo_{1-x}O_2$ thin films. In AIP Conference Proceedings (vol. 1447, No. 1, pp. 613-614). American Institute of Physics. (Year: 2012).*
Notification of Grant of Patent Right and Notification of Registration of Patent Right in counterpart Chinese application CN201910655730.8 mailed Oct. 26, 2020, 4 pages in Chinese.
Guo, Feilong; Decision to Grant for Japan Application No. 2021530099, filed, May 22, 2020, mailed Mar. 6, 2023, 5 pages.
Guo, Feilong; First Office Action for India Application No. 202137014452, filed Mar. 30, 2021, mailed May 27, 2022, 7 pages.
Guo, Feilong; First Office Action for Japan Application No. 2021530099, filed, May 22, 2020, mailed Jun. 7, 2022, 8 pages.
Guo, Feilong; International Search Report for Application No. PCT/CN2020/091800 filed May 22, 2020, mailed Jul. 30, 2020, 5 pages.
Guo, Feilong; Second Office Action for Chinese Application No. 201910655730.8, filed, Jul. 19, 2019, mailed Sep. 8, 2020, 19 pages.

* cited by examiner

CATHODE AND ELECTROCHEMICAL DEVICE

CROSS REFERENCE TO RELATED APPLICATIONS

The present application is a National Stage application of PCT international application: PCT/CN2020/091800 filed on May 22, 2020, which claims the benefit of priority from the Chinese Patent Application No. 201910655730.8, filed on 19 Jul. 2019, the disclosures of which are hereby incorporated by reference in their entireties.

BACKGROUND

1. Technical Field

The present application relates to the field of energy storage devices, and in particular to a cathode and an electrochemical device.

2. Description of the Related Art

With the development of the power tool market, the requirements for electrochemical devices (for example, lithium-ion batteries) suitable for the power tool market are becoming ever higher, especially for lithium-ion batteries, which are required to have low cost, high energy density, long cycle life, high power density and other properties.

At present, lithium-ion batteries used in mobile electronic devices mostly use lithium cobalt oxide as the cathode material. However, cobalt is a highly toxic, costly and a resource-constrained element, thus the development of low-cobalt cathode materials is an inevitable trend. High-nickel cathode materials have received wide attention due to their lower cobalt content, especially given higher actual capacity than lithium cobalt oxide. However, high-nickel cathode materials have high bulk density, and the particles easily break and produce gas under high compaction density, which limits the application thereof in high energy density batteries.

The improvements to nickel-containing cathode materials in the prior art are primarily directed to low rate (<4 C) cycle performance. Furthermore, more attention has been paid to the safety issues of nickel-containing cathode materials. For example, the compaction density and the volumetric energy density of the cathode material are improved by performing grading or gradient shell treatment on the precursor, or directly doping and coating the secondary material of the cathode material, thereby improving the rate and cycle performance of the lithium-ion battery prepared therefrom. However, the cathode material modified by the above method is not suitable for a high power (for example, a charge and discharge of 4 C or above) lithium-ion battery.

SUMMARY

In order to overcome the above drawbacks, the present application provides a lithium-ion battery which can achieve high compaction density and reduced gas production of the cathode, thereby achieving high rate and long cycle performance.

According to a first aspect of the present application, the present application provides a cathode including: a cathode current collector; and a cathode active material layer disposed on a surface of the cathode current collector, wherein the cathode active material layer includes a first particle and a second particle, the first particle including a first secondary particle composed of a third particle, the third particle being a first primary particle, the first particle having an average particle size of 5 μm to 20 μm, the third particle having an average particle size of 200 nm to 700 nm, the second particle includes a fourth particle and/or a second secondary particle composed of the fourth particle, the fourth particle being a second primary particle, the second particle having an average particle size of 3 μm to 5 μm, the fourth particle having an average particle size of 800 nm to 5 μm, a region containing the first particle is closer to the cathode current collector than a region containing the second particle.

In some embodiments, the cathode active material layer includes a first layer and a second layer, wherein the first layer includes the first particle, and the second layer includes the second particle.

In some embodiments, in the thickness direction of the cathode active material layer, a concentration of the second particle decreases with the decrease in distance from the cathode current collector, and a concentration of the first particle increases with the decrease in distance from the cathode current collector.

In some embodiments, wherein the first particle includes the first secondary particle composed of 150 to 2000 third particles, and the second particle includes the second secondary particle composed of 2 to 100 fourth particles.

In some embodiments, a thickness ratio of the second layer to the first layer is about 1:10 to about 1:1.

In some embodiments, the cathode active material layer further includes a conductive agent, wherein a concentration of the conductive agent decreases with the decrease in distance from the cathode current collector.

In some embodiments, the first particle has a specific surface area of about 0.10 m$^2$/g to about 1.50 m$^2$/g, and the second particle has a specific surface area of about 0.30 m$^2$/g to about 2.50 m$^2$/g, wherein a ratio of the specific surface area of the second particle to the specific surface area of the first particle is about 1:1 to about 5:1.

In some embodiments, a peak intensity ratio of the (003) diffraction peak of the X-ray diffraction of the second particle to the first particle is about 1.03 to about 1.6, and a half peak width difference of the (003) diffraction peak of the X-ray diffraction of the first particle and the second particle is about 0.002° to about 0.008°.

In some embodiments, a ratio of an average particle size of the first particle to an average particle size of the second particle is about 2:1 to about 10:1.

In some embodiments, the first particle is a first lithium-containing transition metal oxide having a chemical formula of $Li_\alpha Ni_x Co_y M1_z N1_\beta O_2$, wherein $0.95 \leq \alpha \leq 1.05$, $0.5 \leq x < 1$, $0 < y < 0.4$, $0 < z < 0.4$, $0 \leq \beta \leq 0.05$, and $x+y+z+\beta=1$, M1 is at least one selected from the group consisting of Mn and Al; and N1 is at least one selected from the group consisting of Mg, Ti, Zr, Nb, Y, Cr, V, Ge, Mo and Sr; the second particle is a second lithium-containing transition metal oxide having a chemical formula of $Li_n Ni_a Co_b M2_c N2_d O_2$, wherein $0.95 \leq n \leq 1.05$, $0.3 \leq a < 1$, $0 < b < 0.4$, $0 < c < 0.4$, $0 \leq d \leq 0.02$, and $a+b+c+d=1$, M2 is at least one selected from the group consisting of Mn and Al; and N2 is at least one selected from the group consisting of Mg, Ti, Zr, Nb, Y, Cr, V, Ge, Mo, and Sr.

In some embodiments, the nickel content of the first lithium-containing transition metal oxide is greater than the nickel content of the second lithium-containing transition metal oxide.

In some embodiments, at an edge of the cathode active material layer, the second layer extends beyond the first layer.

According to a second aspect of the present application, the present application provides an electrochemical device including an anode; a separator; an electrolyte; and any of the foregoing cathodes.

Additional aspects and advantages of the embodiments of the present application will be described or shown in the following description or interpreted by implementing the embodiments of the present application.

BRIEF DESCRIPTION OF THE DRAWINGS

The following will briefly illustrate the accompanying drawings. Drawings necessary to describe the embodiments of the present application will be briefly illustrated so as to facilitate the description of the embodiments of the present application. Obviously, the accompanying drawings described below only show some embodiments of the present application. For those skilled in the art, the drawings of other embodiments can still be obtained from the structures illustrated in the drawings without the need for creative efforts.

DETAILED DESCRIPTION

Figure 1A:
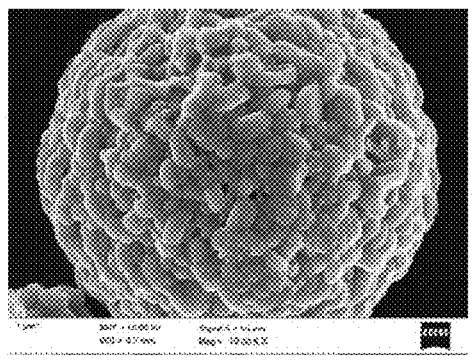
FIG. 1A and FIG. 1B are scanning electron microscope (SEM) photographs of a first particle and a second particle of Embodiment 1, respectively.

The present application will be described below in detail. It shall be understood that terms used in the specification and the annexed claims shall not be explained as limited to meanings in a common sense and dictionaries but be explained based on meanings and concepts corresponding to the technical aspects of the present application on the basis of the principle that the inventor is allowed to properly define the terms to make an optimum explanation. Therefore, the implementation solution in the specification and the description in the drawings are only specific examples used for the purpose of description rather than the intention to illustrate all technical aspects of the present application, and it shall be understood that, when the present application is filed, various alternative equivalents and variants may be completed thereto.

As used in the present application, the terms "approximately", "substantially", "essentially", and "about" are used for describing and explaining a small variation. When used in combination with an event or circumstance, such terms may refer to an example in which the event or circumstance occurs precisely, or an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference between two numerical values is less than or equal to ±10% of the average of the values (e.g., less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values may be considered "substantially" the same.

In addition, sometimes, a quantity, a ratio, and/or other values may be presented in a range format in the present application. It should be appreciated that such range formats are for convenience and conciseness, and should be flexibly understood as including not only those values explicitly specified to the range constraints, but also to all individual values or sub-ranges within the ranges, such as in explicitly specifying each value and each sub-range.

I. Cathode

The present application provides a cathode including: a cathode current collector; and a cathode active material layer disposed on a surface of the cathode current collector, wherein the cathode active material layer includes a first particle and a second particle, the first particle includes a first secondary particle composed of a third particle, the third particle is a first primary particle, the first particle has an average particle size (the average particle size in the present application is Dv50, which means a particle size with which the volume cumulative frequency from the smaller particle size side reaches 50% in the volume-based particle size distribution) of 5 μm to 20 μm, the third particle has an average particle size of 200 nm to 700 nm, the second particle includes a fourth particle and/or a second secondary particle composed of the fourth particle, the fourth particle is a second primary particle, the second particle has an average particle size of 3 μm to 5 μm, the fourth particle has an average particle size of 800 nm to 5 μm, a region containing the first particle is closer to the cathode current collector than a region containing the second particle.

In some embodiments, the third particle may have an average particle size of about 300 nm to about 600 nm. In some embodiments, the third particle may have an average particle size of about 400 nm to about 500 nm. In some embodiments, the third particle may have an average particle size of about 300 nm, about 400 nm, about 500 nm, and about 600 nm.

In some embodiments, the fourth particle may have an average particle size of about 1 μm to about 5 μm. In some embodiments, the fourth particle may have an average particle size of about 1.2 μm to about 5 μm. In some embodiments, the fourth particle may have an average particle size of about 1.4 μm to about 5 μm. In some embodiments, the fourth particle may have an average particle size of about 1.6 μm to about 5 μm. In some embodiments, the fourth particle may have an average particle size of about 1.8 μm to about 5 μm. In some embodiments, the fourth particle may have an average particle size of about 2 μm to about 5 μm. In some embodiments, the fourth particle may have an average particle size of about 2.2 μm to about 5 μm. In some embodiments, the fourth particle may have an average particle size of about 2.4 μm to about 5 μm. In some embodiments, the fourth particle may have an average particle size of about 2.6 μm to about 5 μm. In some embodiments, the fourth particle may have an average particle size of about 2.8 μm to about 5 μm. In some embodiments, the fourth particle may have an average particle size of from about 3 μm to about 5 μm. In some embodiments, the fourth particle may have an average particle size of about 3.2 μm to about 5 μm. In some embodiments, the fourth particle may have an average particle size of about 3.4 μm to about 5 μm. In some embodiments, the fourth particle may have an average particle size of about 3.6 μm to about 5 μm. In some embodiments, the fourth particle may have an average particle size of about 3.8 μm to about 5 μm. In some embodiments, the fourth particle may have an average particle size of about 4 μm to about 5 μm. In some embodiments, the fourth particle may have an average particle size of about 4.2 μm to about 5 μm. In some embodiments, the fourth particle may have an average particle size of about 4.4 μm to about 5 μm. In some embodiments, the fourth particle may have an average particle size of about 4.6 μm to about 5 μm. In some embodiments, the fourth particle may have an average particle size of about 900 nm, about 1 μm, about 1.5 μm, about 2 μm, about 3 μm, and about 4 μm. An excessively large fourth particle may cause deterioration of the kinetic performance of the cathode material, and an excessively small fourth particle may cause deterioration of structural stability of the cathode material.

In some embodiments, in the thickness direction of the cathode active material layer, a concentration of the second particle decreases with the decrease in distance from the cathode current collector. In some embodiments, the concentration of the second particle decreases in a linear curve along the direction described above. In some embodiments, the concentration of the second particle decreases in a non-linear curve along the direction described above. In some embodiments, the concentration of the second particle decreases in a parabolic profile, in a free fall to ball groove curve or in a step curve along the direction described above. In some embodiments, the concentration of the second particle decreases in a wavy curve along the direction described above. In some embodiments, in the thickness direction of the cathode active material layer, a concentration of the first particle increases with the decrease in distance from the cathode current collector. In some embodiments, the concentration of the first particle increases in a linear curve along the direction described above. In some embodiments, the concentration of the first particle increases in a non-linear curve along the direction described above. In some embodiments, the concentration of the first particle increases in a parabolic profile, in a free fall to ball groove curve or in a step curve along the direction described above. In some embodiments, the concentration of the first particle increases in a wavy curve along the direction described above.

Figure 1B:
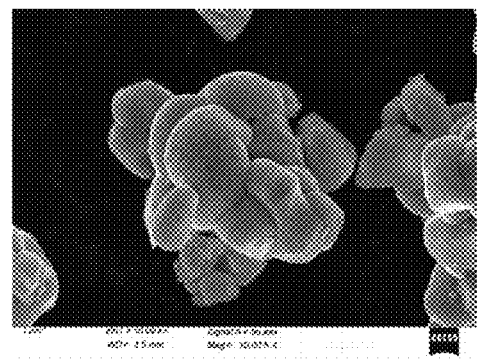

FIG. 1A and FIG. 1B are scanning electron microscope (SEM) photographs of the first particle and the second particle of Embodiment 1, respectively. As shown in FIG. 1A, the first particle may be a spherical or ellipsoidal secondary particle formed by tightly bonding the third particles. As shown in FIG. 1B, the second particle may be an irregularly shaped secondary particle stacked by the fourth particles.

In some embodiments, the first particle can include about 150 to about 2000 third particles. In some embodiments, the first particle can include about 600 to about 1000 third particles. In some embodiments, the first particle can include about 700 to about 800 third particles. In some embodiments, the first particle can include about 200, about 500, about 800, about 1000, about 1500 third particles. The third particle has an average particle size of 200 nm to 700 nm.

In some embodiments, the second particle includes the second secondary particle composed of 2 to 100 fourth particles. In some embodiments, the second particle can include about 20 to about 90 fourth particles. In some embodiments, the second particle can include about 30 to about 70 fourth particles. In some embodiments, the second particle can include about 40 to about 60 fourth particles. In some embodiments, the second particle can include about 10, about 20, about 30, about 40, about 50, about 80 fourth particles. The fourth particle may have an average particle size of about 800 nm to about 5 μm.

Figure 2A:
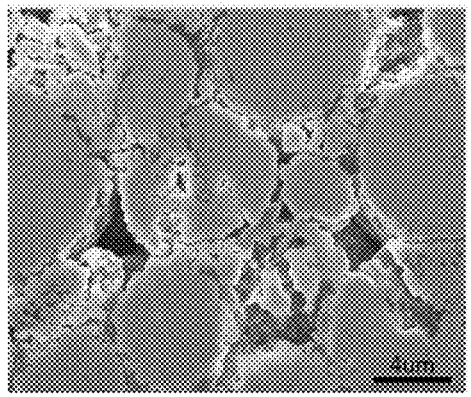
FIG. 2A is an SEM image showing a cross section of a cathode of a lithium-ion battery in Comparative Example 2 after circulating 500 times at the rate of 8 C.
Figure 2B:
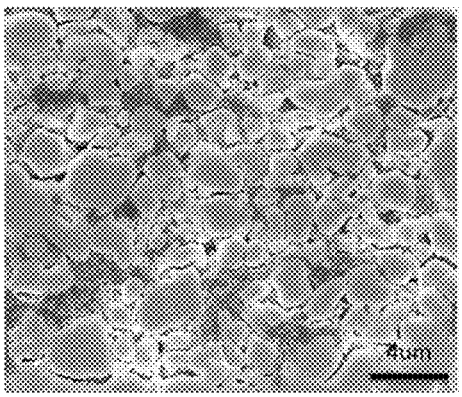
FIG. 2B is an SEM image showing a cross section of a cathode of a lithium-ion battery in Comparative Example 1 after circulating 500 times at the rate of 8 C.

It has been found by the present application that the second particle is less susceptible to breakage during cycling (as shown in FIG. 2B) as compared to the first particle which is prone to particle breakage during cycling (as shown in FIG. 2A). This is mainly because the surface of the second particle is smoother than that of the first particle and is easy to slide, thereby improving the slippage between the particles and reducing the internal friction. In addition, the internal crystal structure of the second particle is less defective, and the stress caused by the lattice change is more easily released during the cycling, which in turn reduces particle breakage. Therefore, by using the second particle and the first particle, the second particle can be filled in the gap of the first particle at the interface, thereby increasing the powder bulk density and reducing the rolling pressure while ensuring the same compaction density, so that the particle breakage is reduced during cold pressing. The cathode active material layer is provided such that the second particles are located in a region away from the cathode current collector and the first particles are located in a region close to the cathode current collector. As such, the stability of the second particle during the cycle process in combination with the high kinetic performance of the first particle can be achieved, the particle breakage problem can be significantly improved during the cold pressing and cycling of the cathode without the loss of other properties (for example, energy density/DC resistance (DCR)/Rate, etc.), so that the gas production can be delayed during the cycling and the performance of large rate cycling can be improved.

In some embodiments, the cathode active material layer includes a first layer and a second layer, wherein the first layer includes the first particle and the second layer includes the second particle. In some embodiments, a thickness ratio of the second layer to the first layer is 1:10 to 1:1.

In some embodiments, at an edge of the cathode active material layer, the second layer extends beyond the first layer. The foregoing arrangement can ensure that the second particle forms complete protection for the first particle, which is beneficial to overcome the gas production problem during the cycle of the cathode materials.

In some embodiments, a peak intensity ratio of the (003) diffraction peak of the X-ray diffraction of the second particle to the first particle is about 1.03 to about 1.6, and a half peak width difference of the (003) diffraction peak of the X-ray diffraction of the first particle and the second particle is about 0.002° to about 0.008°.

In some embodiments, the peak intensity ratio of the (003) diffraction peak of the X-ray diffraction of the second particle to the first particle may be about 1.1 to about 1.5 or about 1.2 to about 1.3. In some embodiments, the half peak width difference of the (003) diffraction peak of the X-ray diffraction of the first particle and the second particle may be about 0.003° to about 0.007°, about 0.004° to about 0.006°.

It has been found from the study of the present application that the second particle has a significantly higher crystallinity than the first particle, and thus the peak intensity of the (003) diffraction peak of the X-ray diffraction of the second particle is higher than that of the first particle, and the half peak width of the second particle is narrower than that of the first particle. The difference in the peak intensity ratio and the half peak width difference of the (003) diffraction peak of the X-ray diffraction mainly depends on the difference in the mixing ratio of the second particle and the first particle. The higher the proportion of the second particle, the larger the peak intensity ratio of the (003) diffraction peak of the X-ray diffraction, and the larger the half peak width difference. Excessively large and excessively small peak intensity ratios and half peak widths reflect a too high or too low proportion of the second particle. The second particle has a large specific surface area (BET), a high DC resistance (DCR), and poor kinetic performance, so that a too large mixing ratio of the second particle would lower the compaction density of the cathode material, seriously affect the dynamic performance of the material, and deteriorate the rate performance, low temperature performance and high temperature performance of the materials, and a too small mixing ratio of the second particle would not achieve the effect of increasing the compaction density of the material and maintaining structural stability. Thus, in some embodiments of the present application, by controlling the peak intensity ratio of the (003) diffraction peak of the X-ray diffraction of the second particle to the first particle and the half peak width difference of the (003) diffraction peak of the X-ray diffraction of the first particle and the second particle within the foregoing range, or by controlling the proportion of the second particle and the first particle, the desired effect of the present application can be attained.

In some embodiments, the first particle is a first lithium-containing transition metal oxide having a chemical formula of $Li_\alpha Ni_x Co_y M1_z N1_\beta O_2$, wherein $0.95 \leq \alpha \leq 1.05$, $0.5 \leq x < 1$, $0 < y < 0.4$, $0 < z < 0.4$, $0 \leq \beta \leq 0.05$, and $x+y+z+\beta=1$, M1 is at least one selected from the group consisting of Mn and Al; and NI is at least one selected from the group consisting of Mg, Ti, Zr, Nb, Y, Cr, V, Ge, Mo and Sr; the second particle is a second lithium-containing transition metal oxide having a chemical formula of $Li_n Ni_a Co_b M2_c N2_d O_2$, wherein $0.95 \leq n \leq 1.05$, $0.3 \leq a < 1$, $0 < b < 0.4$, $0 < c < 0.4$, $0 \leq d \leq 0.02$, and $a+b+c+d=1$, M2 is at least one selected from the group consisting of Mn and Al; and N2 is at least one selected from the group consisting of Mg, Ti, Zr, Nb, Y, Cr, V, Ge, Mo, and Sr.

In some embodiments, the second particle has a molar percentage of Ni of about 30% to about 80%; and the first particle has a molar percentage of Ni of about 50% to about 90%; and the ratio of the molar percentage of Ni in the second particle to the molar percentage of Ni in the first particle is about 1:1 to about 1:3. In some embodiments, the nickel content of the first lithium-containing transition metal oxide is greater than the nickel content of the second lithium-containing transition metal oxide.

It has been found from the study of the present application that the lower the nickel content, the better the thermal stability and cycle performance of the cathode material (as shown in Embodiments 1-3). Therefore, in some embodiments of the present application, the nickel content in the second particle in the region away from the cathode current collector of the cathode active material layer is set to be smaller than the nickel content in the first particle in the region close to the cathode current collector, so that the structural stability of the cathode can be further improved, which is advantageous for the long cycle performance of the lithium-ion battery at a large rate.

In some embodiments, the cathode active material layer further includes a conductive agent. In some embodiments, the conductive agent includes at least one selected from the group consisting of carbon black, carbon nanotube, graphene and derivatives thereof. In some embodiments, a concentration of the conductive agent decreases with the decrease in distance from the cathode current collector. In some embodiments, the concentration of the conductive agent in the second layer is greater than the concentration of conductive agent in the first layer. In some embodiments, the concentration of the conductive agent in the second layer is about 2% to about 10% based on the total weight of the second layer, the concentration of the conductive agent in the first layer is about 1% to about 5% based on the total weight of the first layer, and the ratio of the concentration of the conductive agent in the second layer to the concentration of the conductive agent in the first layer is about 1:1 to about 10:1.

The concentration of the conductive agent in the second active material layer is set to be larger than the concentration of the conductive agent in the first active material layer, that is, the concentration of the conductive agent increases for the characteristics of the second particle, the kinetic performance of the second particle can be improved, so that the cathode is more suitable for large rate discharge ($\geq 4$ C).

In some embodiments, the cathode active material layer further includes a binder. In some embodiments, the binder includes at least one selected from the group consisting of polyvinylidene fluoride, vinylidene fluoride-hexafluoropropylene copolymer, polyamide, polyacrylonitrile, polyacrylate, polyacrylic acid, polyacrylate, sodium carboxymethylcellulose, polyvinyl pyrrolidone, polyvinyl ether, polymethyl methacrylate, polytetrafluoroethylene, polyhexafluoropropylene, butadiene styrene rubber, and epoxy resin.

In some embodiments, the second particle has an average particle size Dv50 that is less than the Dv50 of the first particle, and the second particle has a specific surface area that is greater than the specific surface area of the first particle. In some embodiments, a ratio of the average particle size of the first particle to the average particle size of the second particle is about 2:1 to about 10:1. In some embodiments, the second particle has a specific surface area of about 0.30 m²/g to about 2.50 m²/g, and the first particle has a specific surface area of about 0.1 m²/g to about 1.50 m²/g, wherein a ratio of the specific surface area of the second particle to the specific surface area of the first secondary particle is about 1:1 to about 5:1.

The present application recognizes that the smaller the average particle size (Dv50) of the material, the greater the specific surface area (BET) and the better the kinetic performance. Therefore, the Dv50 of the second particles in the region away from the cathode current collector of the cathode active material layer is set to be smaller than the Dv50 of the first particles in the region close to the cathode current collector, and the specific surface area of the second particle in the region away from the cathode current collector is larger than the specific surface area of the first particle in the region close to the cathode current collector, so that the kinetic performance of the entire cathode active material layer can be remarkably improved, and the long cycling discharge performance of the cathode at a large rate (≥4 C) can be achieved.

II. Electrochemical Device

The present application further provides an electrochemical device including a cathode of the present application. In some embodiments, the electrochemical device is a lithium-ion battery. The lithium-ion battery includes a cathode of the present application, an anode, a separator, and an electrolyte, wherein the anode includes an anode active material layer and an anode current collector.

The cathode current collector of the cathode in some embodiments of the present application may be aluminum foil or nickel foil, and the anode current collector of the anode may be copper foil or nickel foil. However, other cathode current collectors and anode current collectors commonly used in the art may be used.

The conductive agent and the binder of the anode active material layer are similar to the conductive agent and the binder of the cathode active material layer described above, and will not be described herein. The anode active material layer contains an anode active material including, but not limited to, a material selected from the group consisting of a carbon material, a metal compound, an oxide, a sulfide, a nitride of lithium such as $LiN_3$, a lithium metal, a metal element and a semi-metal element forming an alloy together with lithium, a polymeric material, and a combination thereof.

In the foregoing anode active materials, examples of the carbon materials may comprise low graphitized carbon, easily graphitizable carbon, artificial graphite, natural graphite, mesocarbon microbeads, soft carbon, hard carbon, pyrolytic carbon, coke, vitreous carbon, a sintered body of organic polymer compound, carbon fibers and activated carbon. The coke can include pitch coke, needle coke and petroleum coke. The organic polymer compound sintered body refers to a material obtained by calcining a polymer material such as phenol plastic or furan resin at an appropriate temperature to carbonize the polymer material, and some of these materials are classified into low graphitized carbon or easily graphitized carbon. Examples of the polymer material may include polyacetylene and polypyrrole.

Further, in the anode active material, a material whose charging and discharging voltages are close to those of lithium metal is selected. This is because if the charging and discharging voltages of the anode active material are lower, the battery can more easily have higher energy density. The anode active materials can be selected from carbon materials because their crystal structures are only slightly changed upon charging and discharging, so good cycle characteristics and large charging and discharging capacities can be obtained. In particular, graphite may be selected because it can provide a large electrochemical equivalent and a high energy density.

Further, the anode active material can include elemental lithium metals, metal elements and semi-metal elements capable of forming alloys together with lithium (Li), alloys and compounds thereof, etc. Particularly, the anode material and the carbon material are used together because in this case, good cycle performance and high energy density can be obtained. In addition to the alloys including two or more metal elements, the alloys used here also include alloys including one or more metal elements and one or more semi-metal elements. The alloy may be in a solid solution, a eutectic crystal (eutectic mixture), an intermetallic compound, and a mixture thereof.

Examples of the metal elements and the semimetal elements may comprise tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). Examples of the above alloys and compounds may comprise a material having a chemical formula: $Ma_sMb_tLi_u$ and a material having a chemical formula: $Ma_pMc_qMd_r$. In these chemical formulas, Ma denotes at least one of a metal element and a semimetal element capable of forming an alloy with lithium; Mb denotes at least one of the metal element and the semimetal element other than lithium and Ma; Mc denotes at least one of the non-metallic elements; Md represents at least one of the metal element and the semimetal element other than Ma; and s, t, u, p, q, and r satisfy s≥0, t≥0, u≥0, p>0, q>0, and r≥0.

Further, an inorganic compound not including lithium (Li) such as $MnO_2$, $V_2O_5$, $V_6O_{13}$, NiS, and MoS may be used in the anode active material layer.

In some embodiments, the separator of the present application includes, but is not limited to, at least one selected from polyethylene, polypropylene, polyethylene terephthalate, polyimide, and aramid fiber. For example, the polyethylene includes at least one component selected from the group consisting of high-density polyethylene, low-density polyethylene and ultra-high molecular weight polyethylene. In particular, polyethylene and polypropylene, which have a good effect on preventing short circuits, can improve the stability of the lithium-ion battery by the shutdown effect.

The separator surface may further include a porous layer. The porous layer is disposed on at least one surface of the separator. The porous layer includes inorganic particles and a binder. The inorganic particles are any one or combination of more than one selected from alumina ($Al_2O_3$), silicon oxide ($SiO_2$), magnesium oxide (MgO), titanium oxide ($TiO_2$), hafnium oxide ($HfO_2$), tin oxide ($SnO_2$), cerium oxide ($CeO_2$), nickel oxide (NiO), zinc oxide (ZnO), calcium oxide (CaO), zirconium dioxide ($ZrO_2$), yttrium oxide ($Y_2O_3$), silicon carbide (SiC), boehmite, aluminum hydroxide, magnesium hydroxide, calcium hydroxide, and barium sulfate. The binder is any one or combination of more than one selected from polyvinylidene fluoride, vinylidene fluoride-hexafluoropropylene copolymer, polyamide, polyacrylonitrile, polyacrylate ester, polyacrylic acid, polyacrylate salt, sodium carboxymethylcellulose, polyvinylpyrrolidone, polyvinyl ether, polymethyl methacrylate, polytetrafluoroethylene, and polyhexafluoropropylene.

The porous layer can improve heat resistance, oxidation resistance and electrolytic solution wettability of the separator, and enhance the binding properties between the separator and the cathode or anode.

The lithium-ion battery further comprises an electrolyte that may be one or more of a gel electrolyte, a solid electrolyte, and an electrolytic solution, where the electrolytic solution contains a lithium salt and a nonaqueous solvent.

In some embodiments of the present application, the lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, the lithium salt may be $LiPF_6$, because it can provide high ionic conductivity and improve cycle performance.

The non-aqueous solvent can be a carbonate compound, a carboxylate compound, an ether compound, other organic solvent or a combination thereof.

The carbonate compound can be a chain carbonate compound, a cyclic carbonate compound, a fluorocarbonate compound or a combination thereof.

The chain carbonate compound may be dimethyl carbonate (DMC), diethyl carbonate (DEC), dipropyl carbonate (DPC), methyl propyl carbonate (MPC), ethyl propyl carbonate (EPC), methyl ethyl carbonate (MEC), and a combination thereof. Examples of the cyclic carbonate compound are ethylene carbonate (EC), propylene carbonate (PC), butylene carbonate (BC), vinyl ethylene carbonate (VEC), and a combination thereof. The fluorocarbonate compound may be fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, and a combination thereof.

Examples of the carboxylate compound are methyl formate, methyl acetate, ethyl acetate, n-propyl acetate, t-butyl acetate, methyl propionate, ethyl propionate, propyl propionate, γ-butyrolactone, decalactone, valerolactone, mevalonolactone, caprolactone, and a combination thereof.

Examples of the ether compound are dibutyl ether, tetraethylene glycol dimethyl ether, diethylene glycol dimetyyl ether, 1,2-dimethoxyethane, 1,2-diethoxyethane, ethoxymethoxyethane, 2-methyltetrahydrofuran, tetrahydrofuran, and a combination thereof.

Examples of other organic solvents are dimethyl sulfoxide, 1,2-dioxolane, sulfolane, methylsulfolane, 1,3-dimethyl-2-imidazolldone, N-methyl-2-pyrrolidone, formamide, dimethyl formamide, acetonitrile, trimethyl phosphate, triethyl phosphate, trioctyl phosphate, phosphate ester, and a combination thereof.

Although a lithium-ion battery was used above as an example for the description, after reading the present application, a person skilled in the art can conceive of applying the cathode according to embodiments of the present application to any other suitable electrochemical devices. Such electrochemical devices may include any device for an electrochemical reaction including but not limited to all kinds of primary batteries, secondary batteries, fuel cells, solar cells or capacitors. In particular, the electrochemical device is a lithium secondary battery, including a lithium metal secondary battery, a lithium-ion secondary battery, a lithium polymer secondary battery or a lithium ion polymer secondary battery.

III. Electronic Device

The present application further provides an electronic device that can be any device that uses the electrochemical device according to the present application.

In some embodiments of the present application, the electronic device include, but is not limited to: a notebook computer, a pen-input computer, a mobile computer, an e-book player, a portable phone, a portable fax machine, a portable copier, a portable printer, a head-mounted stereo headphone, a video recorder, an LCD TV, a portable cleaner, a portable CD player, a mini disc player, a transceiver, an electronic notebook, a calculator, a memory card, a portable recorder, a radio, a backup power source, a motor, a vehicle, a motorcycle, a motorized bicycle, a bicycle, a lighting apparatus, a toy, a game console, a clock, an electric tool, a flash light, a camera, a large battery for household use, or a lithium ion capacitor.

The benefits and advantages of the lithium-ion battery of the present application will be described below by taking a lithium-ion battery as an example in combination with a specific preparation method and test for the prepared lithium-ion battery. However, those skilled in the art will understand that the preparation methods described in the present application are merely exemplary, and any other suitable preparation methods also fall within the protection scope of the present application.

IV. Examples

1. Examples 1-29 and Comparative Examples 1-2

Example 1

Example 1 describes a cathode including a first layer having a thickness of about 30 μm disposed on one surface of a current collector and a second layer having a thickness of about 7.5 μm disposed on the outside surface of the first layer; wherein the first layer includes a first particle $LiNi_{0.8}Co_{0.09}Mn_{0.09}Zr_{0.01}Mg_{0.01}O_2$, a carbon black conductive agent and a polyvinylidene fluoride binder, the contents of which are respectively about 97.7%, about 1.3% and about 1.0% based on the total weight of the first layer, the second layer includes a second particle $LiNi_{0.8}Co_{0.09}Mn_{0.09}Zr_{0.01}Mg_{0.01}O_2$, a carbon black conductive agent and a polyvinylidene fluoride binder, the contents of which are respectively about 96%, about 2.3%, and about 1.7% based on the total weight of the second layer; wherein the first particle has a Dv50 of about 8.1 μm and a specific surface area of about 0.632 $m^2/g$, and a second particle has a Dv50 of about 3.6 μm and a specific surface area of about 1.020 $m^2/g$; wherein the second layer extends beyond the first layer at the edge of the cathode active material layer.

A method for preparing a lithium-ion battery is as follows:

Preparation of the Cathode (1) Preparation of the first layer slurry: the first particle, the conductive agent and the binder satisfying the above-mentioned mass ratio and satisfying the aforementioned Dv50 and specific surface area requirements were weighed; and the weighed first particle, the conductive agent and binder were thoroughly stirred and uniformly mixed in an N-methylpyrrolidone solvent system;

(2) Preparation of the second layer slurry: the second particle, the conductive agent and the binder satisfying the above-mentioned mass ratio and satisfying the aforementioned Dv50 and specific surface area requirements were weighed; and the weighed second particles, the conductive agent and binder were thoroughly stirred and uniformly mixed in the N-methylpyrrolidone solvent system;

(3) Preparation of the cathode: the obtained first layer slurry was coated on one surface of an Al foil and dried to obtain a first layer, wherein the thickness of the first layer was controlled to be about 30 μm; the second layer slurry was coated over the first layer and dried to obtain a second layer, wherein the thickness of the second layer was controlled to be about 7.5 μm, wherein the second layer was controlled to extend beyond the first layer at the edge of the cathode; and then the above obtained Al foil was subjected to cold pressing, cutting, and slitting to obtain the cathode.

Preparation of the Anode

Copper foil was used as the anode current collector, and a layer of graphite slurry was uniformly coated on the surface of the copper foil. The slurry was a combination of about 97.7 wt % of artificial graphite, about 1.3 wt % of sodium carboxymethylcellulose (CMC), and about 1.0 wt % of styrene-butadiene rubber (SBR), which was dried at 85° C., and then subjected to cold pressing, cutting, and slitting, and dried under vacuum at 85° C. for 4 hours to prepare the anode.

Preparation of the Electrolyte

A solution prepared from a lithium salt $LiPF_6$ and a nonaqueous organic solvent (ethylene carbonate (EC):diethyl carbonate (DEC):polypropylene carbonate (PC):propyl propionate (PP):vinylene carbonate (VC)=20:30:20:28:2, weight ratio) in a weight ratio of 8:92 was used as an electrolyte of the lithium-ion battery.

Separator

A 12 μm polyethylene (PE) porous polymer film was used as the separator.

Preparation of the Lithium-Ion Battery

The cathode, the separator, and the anode were stacked in order, so that the separator was between the cathode and anode to play the role of separating, and a wound electrode assembly was obtained by winding. After the electrode assembly was subjected to top side sealing, code spraying, vacuum drying, electrolyte injection and high-temperature standing, a formation and capacity test were performed to obtain the lithium-ion battery.

Example 2

Example 2 describes a cathode which differs from the cathode of Example 1 only in that the first particle in the first layer has a Dv50 of about 11.1 μm and a specific surface area of about 0.411 m²/g.

The preparation procedure of Example 2 is basically the same as the preparation procedure of Example 1, except that the first particle satisfying such Dv50 and specific surface area requirements was weighed in step (1) in the preparation of the cathode.

Example 3

Example 3 describes a cathode which differs from the cathode of Example 1 only in that the first particle in the first layer has a Dv50 of about 16.3 μm and a specific surface area of about 0.398 m²/g.

The preparation procedure of Example 3 is basically the same as the preparation procedure of Example 1, except that the first particle satisfying such Dv50 and specific surface area requirements was weighed in step (1) in the preparation of the cathode.

Example 4

Example 4 describes a cathode which differs from the cathode of Example 1 only in that the first particle in the first layer has a Dv50 of about 26.5 μm and a specific surface area of about 0.345 m²/g.

The preparation procedure of Example 4 is basically the same as the preparation procedure of Example 1, except that the first particle satisfying such Dv50 and specific surface area requirements was weighed in step (1) in the preparation of the cathode.

Example 5

Example 5 describes a cathode which differs from the cathode of Example 1 only in that the first particle in the first layer has a Dv50 of about 37.2 μm and a specific surface area of about 0.279 m²/g.

The preparation procedure of Example 5 is basically the same as the preparation procedure of Example 1, except that the first particle satisfying such Dv50 and specific surface area requirements was weighed in step (1) in the preparation of the cathode.

Example 6

Example 6 describes a cathode which differs from the cathode of Example 1 only in that the first particle in the first layer has a Dv50 of about 49.6 μm and a specific surface area of about 0.248 m²/g.

The preparation procedure of Example 6 is basically the same as the preparation procedure of Example 1, except that the first particle satisfying such Dv50 and specific surface area requirements was weighed in step (1) in the preparation of the cathode.

Example 7

Example 7 describes a cathode which differs from the cathode of Example 2 only in that the second particle in the second layer has a Dv50 of about 0.8 μm and a specific surface area of about 2.147 m²/g.

The preparation procedure of Example 7 is basically the same as the preparation procedure of Example 2, except that the second particle satisfying such Dv50 and specific surface area requirements was weighed in step (2) in the preparation of the cathode.

Example 8

Example 8 describes a cathode which differs from the cathode of Example 2 only in that the second particle in the second layer has a Dv50 of about 1.2 μm and a specific surface area of about 1.840 m²/g.

The preparation procedure of Example 8 is basically the same as the preparation procedure of Example 1, except that the second particle satisfying such Dv50 and specific surface area requirements was weighed in step (2) in the preparation of the cathode.

Example 9

Example 9 describes a cathode which differs from the cathode of Example 2 only in that the second particle in the second layer has a Dv50 of about 4.2 μm and a specific surface area of about 0.832 m²/g.

The preparation procedure of Example 9 is basically the same as the preparation procedure of Example 1, except that the second particle satisfying such Dv50 and specific surface area requirements was weighed in step (2) of preparation of the second layer slurry in the preparation of the cathode.

Example 10

Example 10 describes a cathode which differs from the cathode of Example 2 only in that the second particle in the second layer has a Dv50 of about 6.9 μm and a specific surface area of about 0.644 m²/g.

The preparation procedure of Example 10 is basically the same as the preparation procedure of Example 1, except that the second particle satisfying such Dv50 and specific surface area requirements was weighed in step (2) in the preparation of the cathode.

Example 11

Example 11 describes a cathode which differs from the cathode of Example 2 only in that the second particle in the second layer has a Dv50 of about 9.8 μm and a specific surface area of about 0.487 m$^2$/g.

The preparation procedure of Example 11 is basically the same as the preparation procedure of Example 3, except that the second particle satisfying such Dv50 and specific surface area requirements was weighed in step (2) in the preparation of the cathode.

Example 12

Example 12 describes a cathode which differs from the cathode of Example 2 only in that the second particle in the second layer has a Dv50 of about 11.0 μm and a specific surface area of about 0.419 m$^2$/g.

The preparation procedure of Example 12 is basically the same as the preparation procedure of Example 3, except that the second particle satisfying such Dv50 and specific surface area requirements was weighed in step (2) in the preparation of the cathode.

Example 13

Example 13 describes a cathode which differs from the cathode of Example 2 only in that the thicknesses of the first layer and the second layer are both about 18.75 μm, that is, the ratio of the thickness of the second layer to the thickness of the first layer is 1:1.

The preparation procedure of Example 13 is basically the same as the preparation procedure in Example 2, except that the above-mentioned thickness requirements for the first layer and the second layer were achieved by controlling the coating step in step (3) in the preparation of the cathode.

Example 14

Example 14 describes a cathode which differs from the cathode of Example 2 only in that the thicknesses of the first layer is about 25.0 μm and the thicknesses of the second layer is about 12.50 μm, that is, the ratio of the thickness of the second layer to the thickness of the first layer is 1:2.

The preparation procedure of Example 14 is basically the same as the preparation procedure in Example 2, except that the above-mentioned thickness requirements for the first layer and the second layer were achieved by controlling the coating step in step (3) in the preparation of the cathode.

Example 15

Example 15 describes a cathode which differs from the cathode of Example 2 only in that the thicknesses of the first layer is about 32.16 μm and the thicknesses of the second layer is about 5.36 μm, that is, the ratio of the thickness of the second layer to the thickness of the first layer is about 1:6.

The preparation procedure of the cathode is basically the same as the preparation procedure of Example 3, except that the above-mentioned thickness requirements for the first layer and the second layer were achieved by controlling the coating step in step (3) in the preparation of the cathode.

Example 16

Example 16 describes a cathode which differs from the cathode of Example 2 only in that the thicknesses of the first layer is about 33.28 μm and the thicknesses of the second layer is about 4.16 μm, that is, the ratio of the thickness of the second layer to the thickness of the first layer is about 1:8.

The preparation procedure of Example 16 is basically the same as the preparation procedure in Example 2, except that the above-mentioned thickness requirements for the first layer and the second layer were achieved by controlling the coating step in step (3) in the preparation of the cathode.

Example 17

Example 17 describes a cathode which differs from the cathode of Example 2 only in that the thicknesses of the first layer is about 34.00 μm and the thicknesses of the second layer is about 3.40 μm, that is, the ratio of the thickness of the second layer to the thickness of the first layer is about 1:10.

The preparation procedure of Example 17 is basically the same as the preparation procedure in Example 2, except that the above-mentioned thickness requirements for the first layer and the second layer were achieved by controlling the coating step in step (3) in the preparation of the cathode.

Example 18

Example 18 describes a cathode which differs from the cathode of Example 2 only in that the active material of the second layer includes the second particles $LiNi_{0.6}Co_{0.2}Mn_{0.2}O_2$ having a Dv50 of about 6.9 μm and a specific surface area of about 0.486 m$^2$/g.

The preparation procedure of Example 18 is basically the same as the preparation procedure in Example 2, except that the second particle satisfying the above requirements was weighed in step (2) in the preparation of the cathode.

Example 19

Example 19 describes a cathode which differs from the cathode of Example 2 only in that the active material of the second layer includes the second particles $LiNi_{0.5}Co_{0.2}Mn_{0.3}O_2$ having a Dv50 of about 6.9 μm and a specific surface area of about 0.486 m$^2$/g.

The preparation procedure of Example 19 is basically the same as the preparation procedure in Example 2, except that the second particle satisfying the above requirements was weighed in step (2) in the preparation of the cathode.

Example 20

Example 20 describes a cathode which differs from the cathode of Example 2 only in that the active material of the first layer includes $LiNi_{0.6}Co_{0.2}Mn_{0.2}O_2$.

The preparation procedure of Example 20 is basically the same as the preparation procedure in Example 2, except that the first particle satisfying the above requirements was weighed in step (1) in the preparation of the cathode.

Example 21

Example 21 describes a cathode which differs from the cathode of Example 2 only in that the active material of the first layer includes $LiNi_{0.5}Co_{0.2}Mn_{0.3}O_2$.

The preparation procedure of Example 21 is basically the same as the preparation procedure in Example 2, except that the first particle satisfying the above requirements was weighed in step (1) in the preparation of the cathode.

Example 22

Example 22 describes a cathode which differs from the cathode of Example 2 only in that the content of the conductive agent in the first layer is adjusted to about 1.0%, and the content of the first particle is accordingly adjusted to about 98.0%, the content of the conductive agent in the second layer is adjusted to about 2.1%, and the content of the second particle is accordingly adjusted to about 96.2%.

The preparation procedure of Example 22 is substantially the same as the preparation procedure in Example 2, except that the contents of the active material (i.e., the first or second particle) and the conductive agent weighed in the steps (1) and (2) in the preparation of the cathode were adjusted to meet the above proportion requirements.

Example 23

Example 23 describes a cathode which differs from the cathode of Example 1 only in that the content of the conductive agent in the second layer is adjusted to about 2.1%, and the content of the second particle is accordingly adjusted to about 96.2%.

The preparation procedure of Example 23 is basically the same as the preparation procedure in Example 2, except that the contents of the second particle and the conductive agent weighed in step (2) in the preparation of the cathode were adjusted to meet the above proportion requirements.

Example 24

Example 24 describes a cathode which differs from the cathode of Example 2 only in that the content of the conductive agent in the first layer is adjusted to about 2.4%, and the content of the first particle is accordingly adjusted to about 96.6%, the content of the conductive agent in the second layer is adjusted to about 4.7%, and the content of the second particle is accordingly adjusted to about 93.6%.

The preparation procedure of the cathode is substantially the same as the preparation procedure in Example 2, except that the contents of the active material (i.e., the first or second particle) and the conductive agent weighed in the steps (1) and (2) in the preparation of the cathode were adjusted to meet the above proportion requirements.

Example 25

Example 25 describes a cathode which differs from the cathode of Example 2 only in that the content of the conductive agent in the first layer is adjusted to about 3.7%, and the content of the first particle is accordingly adjusted to about 95.3%, the content of the conductive agent in the second layer is adjusted to about 6.3%, and the content of the second particle is accordingly adjusted to about 92.0%.

The preparation procedure of Example 25 is substantially the same as the preparation procedure in Example 2, except that the contents of the active material (i.e., the first or second particle) and the conductive agent weighed in the steps (1) and (2) in the preparation of the cathode were adjusted to meet the above proportion requirements.

Example 26

Example 26 describes a cathode which differs from the cathode of Example 2 only in that the content of the conductive agent in the first layer is adjusted to about 4.9%, and the content of the first particle is accordingly adjusted to about 94.1%, the content of the conductive agent in the second layer is adjusted to about 9.8%, and the content of the second particle is accordingly adjusted to about 88.5%.

The preparation procedure of Example 26 is substantially the same as the preparation procedure in Example 2, except that the contents of the active material (i.e., the first or second particle) and the conductive agent weighed in the steps (1) and (2) in the preparation of the cathode were adjusted to meet the above proportion requirements.

Example 27

Example 27 describes a cathode which differs from the cathode of Example 2 only in that the cathode active material layer has a 4-layer structure, and a first slurry coating layer, a second slurry coating layer, a first slurry coating layer, and a second slurry coating layer were disposed on the surface of the cathode current collector in order.

The preparation procedure of Example 27 is substantially the same as the preparation procedure in Example 2, except that the first layer slurry and the second layer slurry were alternately coated in step (3) in the preparation of the cathode to obtain the above cathode active material layer having a 4-layer structure.

Example 28

Example 28 describes a cathode which differs from the cathode of Example 2 only in that the cathode active material layer has a 6-layer structure, and a first slurry coating layer, a second slurry coating layer, a first slurry coating layer, a second slurry coating layer, a first slurry coating layer and a second slurry coating layer are disposed on the surface of the cathode current collector in order.

The preparation procedure of Example 28 is substantially the same as the preparation procedure in Example 2, except that the first layer slurry and the second layer slurry were alternately coated in step (3) in the preparation of the cathode to obtain the above cathode active material layer having a 6-layer structure.

Example 29

Example 29 describes a cathode which differs from the cathode of Example 2 only in that the first layer is formed by coating a slurry of a mixture of the first particle and the second particle, wherein the mass ratio of the first particle to the second particle is 9:1.

The preparation procedure of Example 29 is basically the same as the preparation procedure in Example 2, except that the active material weighed in step (1) in the preparation of the cathode was the first particle and the second particle satisfying the mass ratio of 9:1 to prepare the first slurry layer.

Comparative Example 1

Comparative Example 1 describes a cathode which differs from the cathode in Example 1 only in that the cathode of Comparative Example 1 only has the second layer in Example 1, and the thickness of the second layer is about 37.5 μm, the second particle contained therein has a Dv50 of about 2.3 μm and a specific surface area of about 1.040 m$^2$/g, that is, the active material layer of the cathode of Comparative Example 1 only has the second particle.

The preparation procedure of Comparative Example 1 is substantially the same as that in Example 1, except that Comparative Example 1 did not have the steps associated with the first particle in Example 1.

Comparative Example 2

Comparative Example 2 describes a cathode which differs from the cathode of Example 1 only in that the cathode of Comparative Example 2 only has the first layer in Example 1, and the thickness of the first layer is about 37.5 μm, that is, the active material layer of the cathode of Comparative Example 2 only has the first particle.

The preparation procedure of Comparative Example 2 is substantially the same as that in Example 1, except that Comparative Example 2 did not have the steps associated with the second particle in Example 1.

The following tests are respectively conducted on the cathodes of the above Examples 1-29 and Comparative Examples 1-2 and the lithium-ion battery obtained as described above.

Particle Size Measurement

The present application uses a Malvern particle size tester to measure the particle size of the material: the material was dispersed in a dispersant (ethanol), and after 30 minutes of sonication, the sample was added to the Malvern particle size tester to start the test. Dv50 means a particle size with which the volume cumulative frequency from the smaller diameter side reaches 50% in the volume-based particle size distribution, that is, the average particle size. The present application measures the specific surface area of the material by the BET test method (Brunauer-Emmett-Teller, BET). First, a Tri Star II surface analyzer was used, about 3 g to about 6 g of sample was loaded in a sample tube, then the sample was placed in a degassing station, heated and vacuumed, then the heating and vacuuming were stopped to lower the sample temperature to room temperature, the sample was removed to measure the weight of the sample and the sample tube, and then loaded into an analysis station for analysis, data processing and calculation.

Performance Test of Lithium-Ion Battery

SEM Testing

A scanning electron microscope (SEM) is used for obtaining a morphological structure of a sample through mutual effect of an electron beam and the sample and by using secondary electron signal for imaging. An SEM used in the present application was JSM-6360LV SEM of JEOL Company and a matched X-ray energy spectrometer, which were used for analyzing the morphological structure and element distribution of the sample.

The SEM image of a cross section of a pole piece refers to the cross-section pretreatment of the pole piece before the SEM testing. The pretreatment method in the present application is Cross Section Polisher (CP), which uses ion beam cutting to cut out the profile of the sample. Unlike general sample profile polishing, ion beam cutting avoids the effects of stresses caused by the polishing process. When shooting, the pole piece should be as flat as possible and parallel to the test bench.

Cycle Performance Test

Five lithium-ion batteries prepared according to each of the comparative examples and Examples were respectively taken and charged and discharged repetitively through the following steps, the discharge capacity retention rates of the lithium-ion batteries were calculated, and an average value was obtained.

The lithium-ion battery to be tested was allowed to stand at a test temperature of about 45° C. for about 2 hours. The lithium-ion battery was charged at a constant current of about 2 C to about 4.2 V, then charged at a constant voltage of about 4.2 V to about 0.02 C, and allowed to stand for about 15 minutes; then the lithium-ion battery was discharged at a constant current of about 8 C to about 2.8 V, and allowed to stand for about 30 minutes. The above procedure was repeated 500 times to record the discharge capacity at this time. The capacity retention rate of the lithium-ion battery at 500th cycle was calculated by the following formula:

Capacity retention rate at the 500th cycle=(discharge capacity at the 500th cycle/discharge capacity at the first cycle)×100%

Cyclic Expansion Rate Test of Lithium-Ion Battery

The thickness of the lithium-ion battery after 500 cycles was tested using a thickness measuring device, and the thickness variation after 500 cycles was recorded. The expansion ratio of the lithium-ion battery after 500 cycles was calculated by the following formula:

Expansion ratio after 500 cycles=(thickness of lithium-ion battery after 500 cycles/thickness of lithium-ion battery before first cycle−1)×100%

Table 1 below shows in detail the expansion ratio and capacity retention ratio of the lithium-ion batteries of Examples 1-29 and Comparative Examples 1-2 after 500 cycles at about the rate of 8 C.

TABLE 1

|  | Expansion ratio | Capacity retention ratio |
|---|---|---|
| Example 1 | 9.0% | 82.9% |
| Example 2 | 9.0% | 84.4% |
| Example 3 | 8.1% | 83.4% |
| Example 4 | 8.7% | 83.2% |
| Example 5 | 9.2% | 82.7% |
| Example 6 | 9.6% | 79.8% |
| Example 7 | 8.2% | 84.5% |
| Example 8 | 8.2% | 84.4% |
| Example 9 | 8.3% | 84.1% |
| Example 10 | 8.4% | 84.3% |
| Example 11 | 9.8% | 80.2% |
| Example 12 | 10.0% | 79.9% |
| Example 13 | 11.3% | 80.5% |
| Example 14 | 10.4% | 82.7% |
| Example 15 | 12.6% | 81.8% |
| Example 16 | 16.2% | 76.3% |
| Example 17 | 18.7% | 71.2% |
| Example 18 | 7.7% | 86.7% |
| Example 19 | 7.5% | 87.2% |
| Example 20 | 7.3% | 88.9% |
| Example 21 | 7.2% | 89.2% |
| Example 22 | 8.6% | 80.3% |
| Example 23 | 8.2% | 84.1% |
| Example 24 | 8.2% | 85.0% |
| Example 25 | 8.1% | 86.1% |
| Example 26 | 8.0% | 87.4% |
| Example 27 | 8.0% | 85.2% |
| Example 28 | 7.6% | 86.1% |
| Example 29 | 7.4% | 87.2% |
| Comparative Example 1 | 0.8% | 0% |
| Comparative Example 2 | 26.8% | 60.8% |

Note: In Comparative Example 1: the measured expansion rate was relatively low due to the inability to charge and discharge effectively; and due to the characteristics of the second particle, the capacity retention rate dropped to 3% in the first cycle of discharge, and dropped to 0% after several cycles.

Figure 3A:
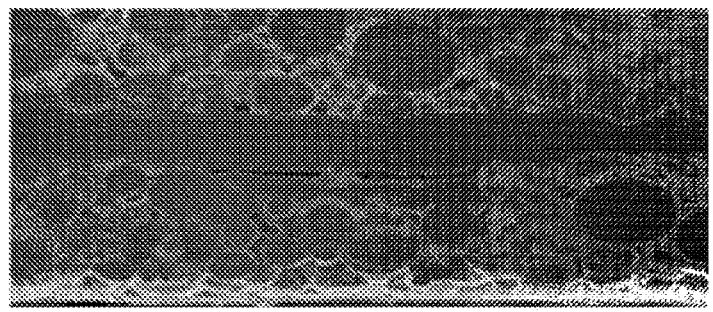
FIG. 3A is an SEM image showing a cross section of the cathode in Comparative Example 2 before circulating.
Figure 3B:
FIG. 3B is an SEM image showing a cross section of the cathode in Comparative Example 2 after circulating 500 times at the rate of 8 C.
Figure 3C:
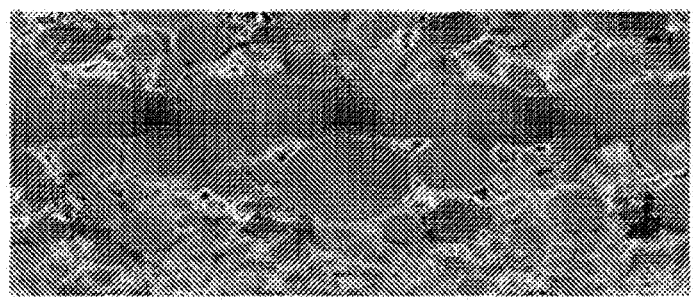
FIG. 3C is an SEM image showing a cross section of the cathode in Embodiment 1 before circulating.
Figure 3D:
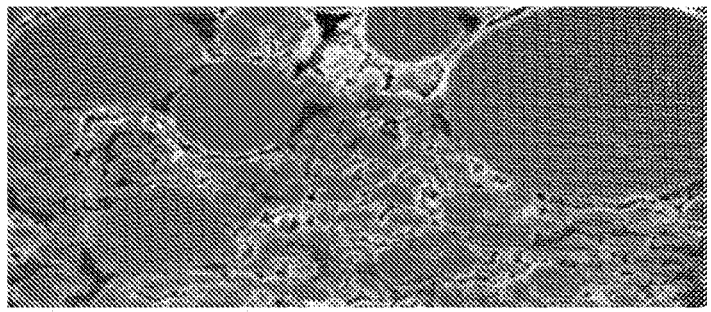
FIG. 3D is an SEM image showing a cross section of the cathode in Embodiment 1 after circulating 500 times at the rate of 8 C.
Figure 4:
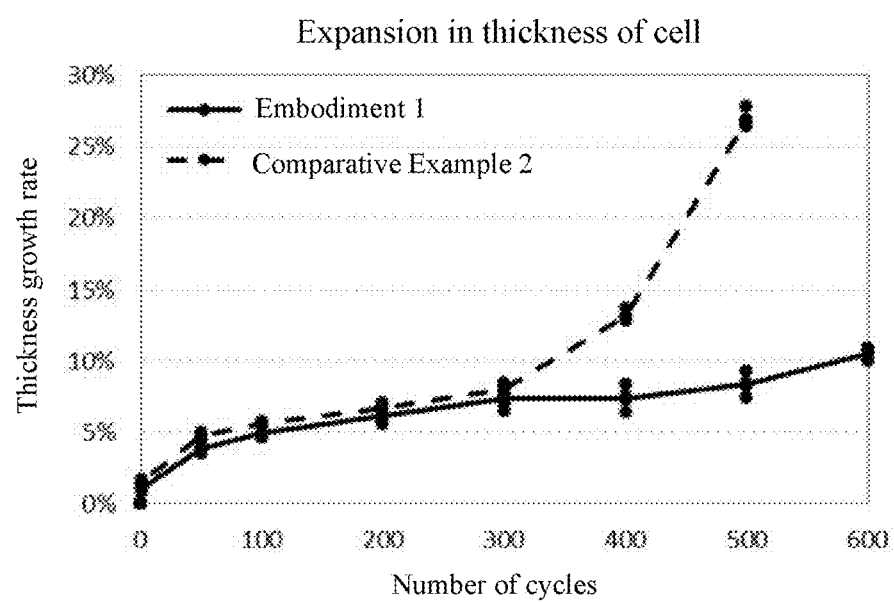
FIG. 4 is a graph showing the relationship between the expansion ratio and the number of cycles of the lithium-ion batteries in Comparative Example 2 and Embodiment 1 at the rate of 8 C.

It can be seen from the analysis of Examples 1-29, Comparative Example 1 and Comparative Example 2 that the cyclic expansion ratio and the cycle capacity retention ratio of the lithium-ion batteries in Examples 1-29 (the cathodes of which have the first particle and the second particle, wherein the first particle is contained in a region close to the cathode current collector, and the second particle is contained in the region away from the cathode current collector) are superior to the cyclic expansion ratio and the cycle capacity retention ratio of the lithium-ion battery in Comparative Example 1 (the cathode of which only has the second particle) and significantly superior to the cyclic expansion ratio and the cycle capacity retention ratio of the lithium-ion battery in Comparative Example 2 (the cathode of which only has the first particle). Further referring to FIG. 3A and FIG. 3B, the expansion ratios of the cathode plate in Example 1 before the cycle and after the 500th cycle at about the rate of 8 C are significantly lower than that of the cathode in Comparative Example 2. Referring further to FIG. 4, at about the rate of 8 C, the cathode in Example 1 has a lower expansion rate with cycling than the cathode in Comparative Example 2, and this tendency becomes more pronounced as the number of cycle increases. This is mainly because the second particle is not easy to break during the cycling, and the first particle has small polarization and good rate performance. By providing the second particle in the region away from the cathode current collector and providing the first particle in the region close to the cathode current collector, the advantages of the two can be combined, the bulk density of the cathode material is increased, the particle breakage in the cold press overcharge is reduced, and the gas production during long cycle at large rate is reduced, thereby achieving the effect of a long cycle at a large rate.

Examples 1-6 adjust the size of the Dv50 of the first particle, respectively. It can be seen from the analysis that the cycle expansion rate and the cycle capacity retention rate of the lithium-ion battery first improve and then decrease as the Dv50 of the first particle increases. This is mainly because as the Dv50 of the first particle increases, the specific surface area decreases correspondingly, and the kinetic performance deteriorates, however, when the Dv50 is too small, the side reaction increases. According to the study of the present application, when the first particle has a Dv50 between about 5 µm and about 20 µm, lithium-ion batteries can achieve optimal comprehensive performance between kinetic performance and side reactions.

Example 2 and Examples 13-17 adjust the thickness ratio of the second layer to the first layer, respectively. It can be seen from the analysis that the cycle expansion ratio and the cycle capacity retention rate of the lithium-ion battery gradually improve as the thickness ratio of the second layer to the first layer decreases. This is mainly because the mixing ratio of the second particle to the first particle can be controlled by adjusting the thickness ratio of the first layer to the second layer. When the mixing ratio of the second particle to the first particle is proper, the second particle can be utilized to increase the compaction density of the material and maintain the structural stability of the material, and the excellent dynamic properties of the first particle can be utilized to improve the cycle life and cycle expansion rate of the lithium-ion battery at a large rate.

Example 2 and Examples 18-19 adjust the molar percentage of Ni in the second layer, respectively. It can be seen from the analysis that the cycle expansion ratio and cycle capacity retention rate of the lithium-ion battery gradually improve as the Ni content decreases. This is mainly because with a lower Ni content, the better the thermal stability and the better the cycle performance. Example 2 and Examples 20-21 respectively adjust the molar percentage of Ni in the first layer, a similar conclusion can be obtained therefrom. Therefore, in some Examples, the nickel content of the second layer (i.e., the outermost layer) of the cathode is set to be smaller than the nickel content of the first layer (i.e., the inner layer) to further improve the structural stability of the outermost layer and improve the cycle life of the lithium-ion battery at a large rate. In some Examples of the present application, the molar percentage of Ni in the cathode active material of the outermost layer is about 30% to about 80%. In some Examples of the present application, the molar percentage of Ni in the lithium-containing transition metal oxide of the inner layer is about 50% to about 90%. In some Examples of the present application, the ratio of the weight of Ni in the cathode active material of the outermost layer to the weight of Ni in the lithium-containing transition metal oxide of the inner layer is about 1:1 to about 1:10.

Example 2 and Examples 22-25 adjust the content of the conductive agent in the first layer and the second layer, respectively. It can be seen from the analysis that the cycle expansion rate and the cycle capacity retention rate of the lithium-ion battery gradually improve as the content of the conductive agent increases. This is mainly because as the content of the conductive agent increases, the kinetic performance is better, and the large-rate discharge is more favorable, thereby improving the cycle life of the lithium-ion battery at a large rate. However, as the content of the conductive agent further increases, the active material is reduced, and thus the energy density is lowered, and therefore, comprehensive consideration is required. It is further contemplated that the second particle has a large polarization and poor kinetic performance, and therefore, in some Examples, the cathode is designed such that the content of the conductive agent in the region close to the cathode current collector is less than the content of the conductive agent in the region away from the cathode current collector in order to improve the kinetic performance of the second particle, so that the cathode is more suitable for large-rate discharge (≥4 C).

Example 2 and Examples 27-28 are arrangements of different layers, wherein the cathode active material layer of Example 2 is a two-layer structure coated with a first slurry layer (which contains the first particle) and a second slurry layer (which contains the second particle), Example 27 is a 4-layer structure in which a first slurry layer and a second slurry layer are alternately coated, and Example 28 is a 6-layer structure in which a first slurry layer and a second slurry layer are alternately coated. It can be seen from the analysis that the multilayer alternating cathode active material layer formed by the first particle and the second particle can improve the cycle expansion ratio and the cycle capacity retention rate of the lithium-ion battery. This is mainly because the interface of the first particle/second particle increases as the number of alternating layers of the first particle/second particle increases, and at the interface, small particles can fill in the gaps around the large particles, thereby increasing the powder bulk density and reducing any rolling pressure while ensuring the same compaction density, so that particle breakage is reduced during cold pressing.

Examples 2 and 29 respectively adjust the composition of the first layer, wherein the first layer of Example 2 is a single layer structure formed of the first particle, and the first layer of Example 29 is a single layer structure formed by the slurry of the mixture of the first particle and the second particle. It can be seen from the analysis that adjusting the first coating to the first particle/second particle mixture can significantly improve the cycle expansion rate and the cycle capacity retention rate of the lithium-ion battery. This is mainly because in the first particle/second particle mixture, the first particle/second particle interface increases, and at the interface, small particles can fill in the gaps around the large particles, thereby increasing the powder bulk density and reducing any rolling pressure while ensuring the same compaction density, so that particle breakage is reduced during cold pressing. Further, in Example 29, the mixing weight ratio of the first particle to the second particle is 9:1, but the present application is not limited thereto, and mixtures having other ratios have similar conclusions.

Described above are Examples listed in the present application. However, since the applicant cannot exhaust all of the Examples, all other equivalent Examples which are obtained based on the teaching of the present application fall within the protection scope of the present application. In summary, the present application provides a simple and suitable method for the industrial production of preparing a cathode and an electrochemical device having high rate performance.

Throughout the specification, references to "some embodiments", "part of embodiments", "one embodiment", "another example", "example", "specific example" or "part of examples" mean that at least one embodiment or example of the present application includes specific features, structures, materials or characteristics described in the embodiment or example. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

The above description summarizes the features of several embodiments, which will enable those of ordinary skill in the art to understand the various aspects of the present application. Those of ordinary skill in the art can readily take the present application as a basis for designing or modifying other compositions to achieve the same objectives and/or the same advantages as the embodiments herein. It is also to be understood by those of ordinary skill in the art that these equal examples do not depart from the spirit and scope of the present application, and it is possible to make various changes, substitutions and modifications to the present application without departing from the spirit and scope of the present application. Although the methods disclosed herein have been described with reference to the specific operations that are performed in a specific order, it should be understood that these operations can be combined, subdivided, or reordered to form an equivalent method without departing from the teachings of the present application. Therefore, the order and grouping of operations are not a limitation to the present application unless specifically indicated herein.

What is claimed is:

1. A cathode, comprising:
    a cathode current collector; and
    a cathode active material layer disposed on a surface of the cathode current collector, wherein the cathode active material layer comprises a first particle and a second particle, the first particle comprising a first secondary particle composed of a third particle, the third particle being a first primary particle, the first particle having an average particle size of 5 μm to 20 μm, the third particle having an average particle size of 600 nm to 700 nm, the second particle comprising a fourth particle and/or a second secondary particle composed of the fourth particle, the fourth particle being a second primary particle, the second particle having an average particle size of 3 μm to 5 μm, the fourth particle having an average particle size of 1 μm to 5 μm; and
    wherein a peak intensity ratio of the (003) diffraction peak of the X-ray diffraction of the second particle to the first particle is 1.03 to 1.6, and a half peak width difference of the (003) diffraction peak of the X-ray diffraction of the first particle and the second particle is 0.002° to 0.008°.

2. The cathode according to claim 1, wherein the cathode active material layer comprises a first layer and a second layer, the first layer comprising the first particle, and the second layer comprising the second particle.

3. The cathode according to claim 1, wherein the first particle comprises the first secondary particle composed of 150 to 2000 third particles, and the second particle comprises the second secondary particle composed of 2 to 100 fourth particles.

4. The cathode according to claim 2, wherein a thickness ratio of the second layer to the first layer is 1:10 to 1:1.

5. The cathode according to claim 1, wherein the cathode active material layer further comprises a conductive agent, a concentration of the conductive agent decreases with the decrease in distance from the cathode current collector.

6. The cathode according to claim 1, wherein the first particle has a specific surface area of 0.10 m$^2$/g to 1.50 m$^2$/g, and the second particle has a specific surface area of 0.30 m$^2$/g to 2.50 m$^2$/g; wherein, a ratio of the specific surface area of the second particle to the specific surface area of the first particle is 3:1 to 5:1.

7. The cathode according to claim 1, wherein a ratio of an average particle size of the first particle to an average particle size of the second particle is 2:1 to 10:1.

8. The cathode according to claim 1, wherein:
    the first particle being a first lithium-containing transition metal oxide having a chemical formula of $Li_\alpha Ni_x Co_y M1_z N1_\beta O_2$, wherein $0.95 \leq a \leq 1.05$, $0.5 \leq x < 1$, $0 < y < 0.4$, $0 < z < 0.4$, $0 \leq \beta \leq 0.05$, and $x+y+z+\beta=1$, M1 being at least one selected from the group consisting of Mn and Al; and N1 being at least one selected from the group consisting of Mg, Ti, Zr, Nb, Y, Cr, V, Ge, Mo and Sr;
    the second particle being a second lithium-containing transition metal oxide having a chemical formula of $Li_n Ni_a Co_b M2_c N2_d O_2$, wherein $0.95 \leq n \leq 1.05$, $0.3 \leq a < 1$, $0 < b < 0.4$, $0 < c < 0.4$, $0 \leq d \leq 0.02$, and $a+b+c+d=1$, M2 being at least one selected from the group consisting of Mn and Al; and N2 being at least one selected from the group consisting of Mg, Ti, Zr, Nb, Y, Cr, V, Ge, Mo, and Sr.

9. The cathode according to claim 8, wherein the nickel content of the first lithium-containing transition metal oxide is greater than the nickel content of the second lithium-containing transition metal oxide.

10. An electrochemical device, comprising:
    an anode;
    a separator;
    an electrolyte; and a cathode, wherein the cathode comprising:
a cathode current collector; and
a cathode active material layer disposed on a surface of the cathode current collector, wherein the cathode active material layer comprises a first particle and a second particle, the first particle comprising a first secondary particle composed of a third particle, the third particle being a first primary particle, the first particle having an average particle size of 5 μm to 20 μm, the third particle having an average particle size of 600 nm to 700 nm, the second particle comprising a fourth particle and/or a second secondary particle composed of the fourth particle, the fourth particle being a second primary particle, the second particle having an average particle size of 3 μm to 5 μm, the fourth particle having an average particle size of 1 μm to 5 μm; and
wherein a peak intensity ratio of the (003) diffraction peak of the X-ray diffraction of the second particle to the first particle is 1.03 to 1.6, and a half peak width difference of the (003) diffraction peak of the X-ray diffraction of the first particle and the second particle is 0.002° to 0.008°.

11. The electrochemical device according to claim 10, wherein the cathode active material layer comprises a first layer and a second layer, the first layer comprising the first particle, and the second layer comprising the second particle.

12. The electrochemical device according to claim 10, wherein the first particle comprises the first secondary particle composed of 150 to 2000 third particles, and the second particle comprises the second secondary particle composed of 2 to 100 fourth particles.

13. The electrochemical device according to claim 10, wherein the first particle has a specific surface area of 0.10 $m^2/g$ to 1.50 $m^2/g$, and the second particle has a specific surface area of 0.30 $m^2/g$ to 2.50 $m^2/g$, wherein a ratio of the specific surface area of the second particle to the specific surface area of the first particle is 3:1 to 5:1.

14. The electrochemical device according to claim 10, wherein:
the first particle being a first lithium-containing transition metal oxide having a chemical formula of $Li_\alpha Ni_x Co_y M1_z N1_\beta O_2$, wherein $0.95 \leq \alpha \leq 1.05$, $0.5 \leq x < 1$, $0 < y < 0.4$, $0 < z < 0.4$, $0 \leq \beta \leq 0.05$, and $x+y+z+\beta=1$, M1 being at least one selected from the group consisting of Mn and Al; and N1 being at least one selected from the group consisting of Mg, Ti, Zr, Nb, Y, Cr, V, Ge, Mo and Sr;
the second particle being a second lithium-containing transition metal oxide having a chemical formula of $Li_n Ni_a Co_b M2_c N2_d O_2$, wherein $0.95 \leq n \leq 1.05$, $0.3 \leq a < 1$, $0 < b < 0.4$, $0 < c < 0.4$, $0 \leq d \leq 0.02$, and $a+b+c+d=1$, M2 being at least one selected from the group consisting of Mn and Al; and N2 being at least one selected from the group consisting of Mg, Ti, Zr, Nb, Y, Cr, V, Ge, Mo, and Sr,
wherein the nickel content of the first lithium-containing transition metal oxide is greater than the nickel content of the second lithium-containing transition metal oxide.

\* \* \* \* \*